United States Patent
Estes et al.

(10) Patent No.: US 7,252,144 B2
(45) Date of Patent: Aug. 7, 2007

(54) MAGNETOMETERS FOR MEASUREMENT-WHILE-DRILLING APPLICATIONS

(75) Inventors: Robert A. Estes, Tomball, TX (US); Roger Cruz, Houston, TX (US); Brent D. Hope, Spring, TX (US); Nico Foekema, Eendenveld (NL)

(73) Assignee: Baker Hughes Incorporated, Houston, TX (US)

( * ) Notice: Subject to any disclaimer, the term of this patent is extended or adjusted under 35 U.S.C. 154(b) by 288 days.

(21) Appl. No.: 10/998,494

(22) Filed: Nov. 29, 2004

(65) Prior Publication Data

US 2005/0199425 A1 Sep. 15, 2005

Related U.S. Application Data

(60) Provisional application No. 60/526,446, filed on Dec. 3, 2003.

(51) Int. Cl.
*E21B 45/00* (2006.01)
(52) U.S. Cl. .............. 166/255.2; 166/250.11; 166/66
(58) Field of Classification Search ............. None
See application file for complete search history.

(56) References Cited

U.S. PATENT DOCUMENTS

| | | | |
|---|---|---|---|
| 5,397,893 A | 3/1995 | Minette | 250/254 |
| 5,513,528 A | 5/1996 | Holenka et al. | 73/151 |
| 5,899,958 A | 5/1999 | Dowell et al. | 702/6 |
| 6,359,438 B1 | 3/2002 | Bittar | 324/369 |
| 6,529,834 B1 * | 3/2003 | Estes et al. | 702/9 |
| 6,584,837 B2 | 7/2003 | Kurkoski | 73/152.02 |
| 6,637,524 B2 * | 10/2003 | Kruspe et al. | 175/40 |
| 6,816,788 B2 | 11/2004 | Van Steenwyk et al. | 702/9 |
| 6,882,937 B2 | 4/2005 | McElhinney | 702/9 |
| 7,000,700 B2 * | 2/2006 | Cairns et al. | 166/255.2 |
| 7,080,460 B2 * | 7/2006 | Illfelder | 33/313 |

* cited by examiner

*Primary Examiner*—Frank Tsay
(74) *Attorney, Agent, or Firm*—Madan, Mossman & Sriram, P.C.

(57) ABSTRACT

A nuclear sensor on a bottomhole assembly (BHA) makes measurements of a property of an earth formation during continued rotation of the BHA. Magnetometers that are susceptible to bias error are deployed on the BHA to make measurements of the magnetic toolface angle. A processor separates the sensor measurements into azimuthal sectors while compensating for inherent time delays in the electronics, non-uniform rotation, and bias.

39 Claims, 12 Drawing Sheets

MAGNETOMETERS FOR MEASUREMENT-WHILE-DRILLING APPLICATIONS

CROSS REFERENCES TO RELATED APPLICATIONS

This applications claims priority from U.S. Provisional Patent Application Ser. No. 60/526,448 filed on Dec. 3, 2003.

BACKGROUND OF THE INVENTION

1. Field of the Invention

This invention relates generally to borehole logging apparatus and methods for performing measurement while drilling applications. More particularly, this invention relates to a new and improved apparatus and method for effecting determination of toolface orientation using downhole magnetometers.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

There are several teachings in prior art that involve partitioning a cross-section of the borehole into a number of sectors. For example, U.S. Pat. No. 5,397,893 to Minette, teaches a method for analyzing data from a measurement-while-drilling (MWD) formation evaluation logging tool which compensates for rotation of the logging tool (along with the rest of the drillstring) during measurement periods. U.S. Pat. No. 5,513,528 to Holenka et al teaches a method and apparatus for measuring formation characteristics as a function of azimuth about the borehole. The measurement apparatus includes a logging while drilling tool which turns in the borehole while drilling. The down vector of the tool is derived first by determining an angle $\phi$ between a vector to the earth's north magnetic pole, as referenced to the cross sectional plane of a measuring while drilling (MWD) tool and a gravity down vector as referenced in said plane. The logging while drilling (LWD) tool includes magnetometers and accelerometers placed orthogonally in a cross-sectional plane. Using the magnetometers and/or accelerometer measurements, the toolface angle can usually be determined. The angle $\phi$ is transmitted to the logging while drilling tool thereby allowing a continuous determination of the gravity down position in the logging while drilling tool. Quadrants, that is, angular distance segments, are measured from the down vector. U.S. Pat. No. 6,584,837 to Kurkoski having the same assignee as the present application and the contents of which are fully incorporated herein by reference teaches a method of azimuthal and offset binning for analysis of nuclear data in an MWD environment.

Minette, Holenka and Kurkoski do not address possible sources of error in relying on magnetometer readings made using magnetometers on a rotating drillstring. One source of error is the nonuniform rotation speed of the drillstring. A second problem is the time delay inherent in the electronics. Measurements may be made simultaneously by the formation sensor and the orientation sensors, but there is a time delay between the time the measurements are made with the two types of sensors and the time at which they are processed. The interaction between the two sources of error, i.e., nonuniform rotation and time delay, can be fairly complex as discussed below. The problem of nonuniform rotation is partially addressed in copending U.S. patent application Ser. No. 10/629,268 of Cairns et al. having the same assignee and the contents of which are fully incorporated herein by reference. However, addressing the non-uniform rotation by itself gives only a partial solution. In addition, there is the problem of bias in the orientation sensor measurements. Generally, magnetometers are preferred as orientation sensors over gyroscopes, and magnetometers are susceptible to errors causes by metallic drill collars, casing, and accumulated debris. There is a need for a method of determining accurate orientation values using measurements made by a magnetometer on a MWD logging tool. The present invention satisfies this need.

SUMMARY OF THE INVENTION

One embodiment of the present invention is a method of evaluating an earth formation during drilling. Measurements are made with an orientation sensor indicative of a toolface angle of a bottomhole assembly (BHA) during rotation. Measurements are also made with a directionally sensitive formation evaluation (FE) sensor during rotation of the BHA The measurements made by the FE sensor are corrected using a speed of rotation of the BHA. The orientation measurements may be made by a magnetometer, gyroscope, or an accelerometer. The directionally sensitive FE sensors may include a nuclear sensor, a resistivity sensor, a nuclear magnetic resonance sensor and a natural gamma sensor. The correcting of the FE sensor measurements is based on verifying the occurrence of rotation of the BHA by analysis of measurements made by the orientation sensor.

The correcting of the FE sensors may include accumulating orientation measurements over a time interval or over a selected number of rotations of the BHA. A bias value for the orientation measurements may be determined. A low pass filter may be applied to the orientation measurements.

Another embodiment of the invention is an apparatus for evaluating an earth formation during drilling. The apparatus an orientation sensor on a BHA which makes measurements indicative of a toolface angle of the BHA during rotation. A directionally sensitive FE sensor on the BHA makes measurements of a property of the earth formation during the rotation. A processor corrects the FE sensor measurements using a speed of rotation of the BHA. The orientation sensor is selected from the group consisting of (i) a magnetometer, (ii) gyroscope, and, (iii) an accelerometer. The directionally sensitive FE sensor may be a nuclear sensor, a resistivity sensor, a nuclear magnetic resonance sensor, or a natural gamma sensor. The processor may correct the FE sensor measurements based at least in part on verification of occurrence of rotation of the BHA. The measurements of the orientation sensor may be accumulated over a time interval or for a specified number of rotations of the BHA. The processor may correct the FE sensor measurements by determining a bias value and/or scale factor in the orientation sensor measurements. A low pass filtering may be applied. The BHA may be conveyed in the borehole on a drillstring or on coiled tubing.

Another embodiment of the present invention is a machine readable medium having instructions for evaluating an earth formation. The medium includes instructions for using a measurements made by an orientation sensor on a rotating BHA for correcting a measurements made by a directionally sensitive FE sensor on the BHA using a speed of rotation of the BHA. The orientation sensor may be a magnetometer or an accelerometer. The directionally sensitive FE sensor may be a nuclear sensor, a resistivity sensor, a nuclear magnetic resonance sensor or a natural gamma sensor. Instructions for verifying the occurrence of rotation of the BHA by analysis of the orientation sensor measurements may be included. Instructions for determining a bias and/or scale factor in the orientation sensor measurements may be included in the medium. The medium may be a ROM, an EPROM, an EEPROM, a Flash Memories, or an Optical disk.

Another embodiment of the invention is a method of drilling a borehole in an earth formation. A plurality of magnetometers are conveyed into the borehole. From the outputs of the magnetometers, an indication of a source of magnetic disturbance in proximity to the borehole is obtained and the drilling direction is controlled based on the indication. The source of the magnetic disturbance may be a casing external to the wellbore. The magnetometers may be two-component magnetometer. The indication of the magnetic disturbance may be a magnetic field gradient. During the processing outputs of the plurality of magnetometers may be clipped. The control of the drilling direction is based at least in part on an asymmetry of measurements made by at least one of the plurality of magnetometers during continued rotation of the BHA. Bias in the magnetometers may be determined. The external casing may include a permanent magnet or a radioactive source. Use may be made of $B_x$ measurements at orientations of the BHA substantially 180° apart and $B_y$ measurements at orientations of the BHA substantially orthogonal to the orientations at which the $B_x$ measurements are made.

In another embodiment, the present invention comprises an apparatus for drilling a borehole in an earth formation. The apparatus includes BHA including a drill bit, at least two magnetometers positioned at substantially opposite sides of he BHA, a processor on the BHA which determines from outputs of the at least two magnetometers a magnetic field gradient and controls a drilling direction of the BHA based on the determined magnetic field gradient. The two magnetometers may be two-component magnetometers. The determined field gradient may be indicative of a direction of a casing external to the borehole.

BRIEF DESCRIPTION OF THE FIGURES

For detailed understanding of the present invention, references should be made to the following detailed description of the preferred embodiment, taken in conjunction with the accompanying drawings, in which like elements have been given like numerals and wherein.

DETAILED DESCRIPTION OF THE INVENTION

Figure 1:
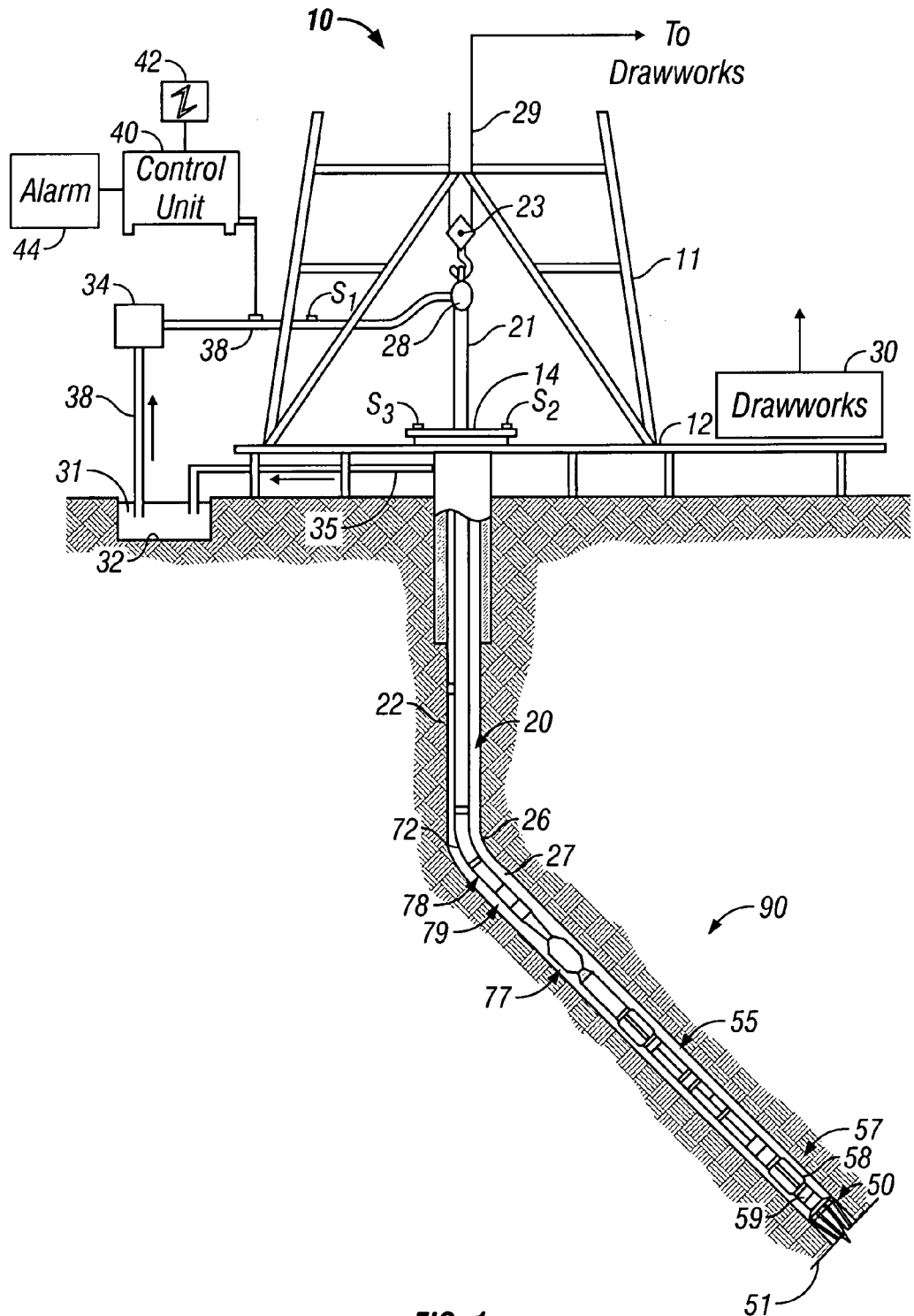
FIG. 1 (prior art) is a schematic illustration of a drilling system suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger 36, fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 100. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. The system also includes a downhole processor, sensor assembly for making formation evaluation and an orientation sensor. These may be located at any suitable position on the bottom hole assembly (BHA).

Figure 2A:
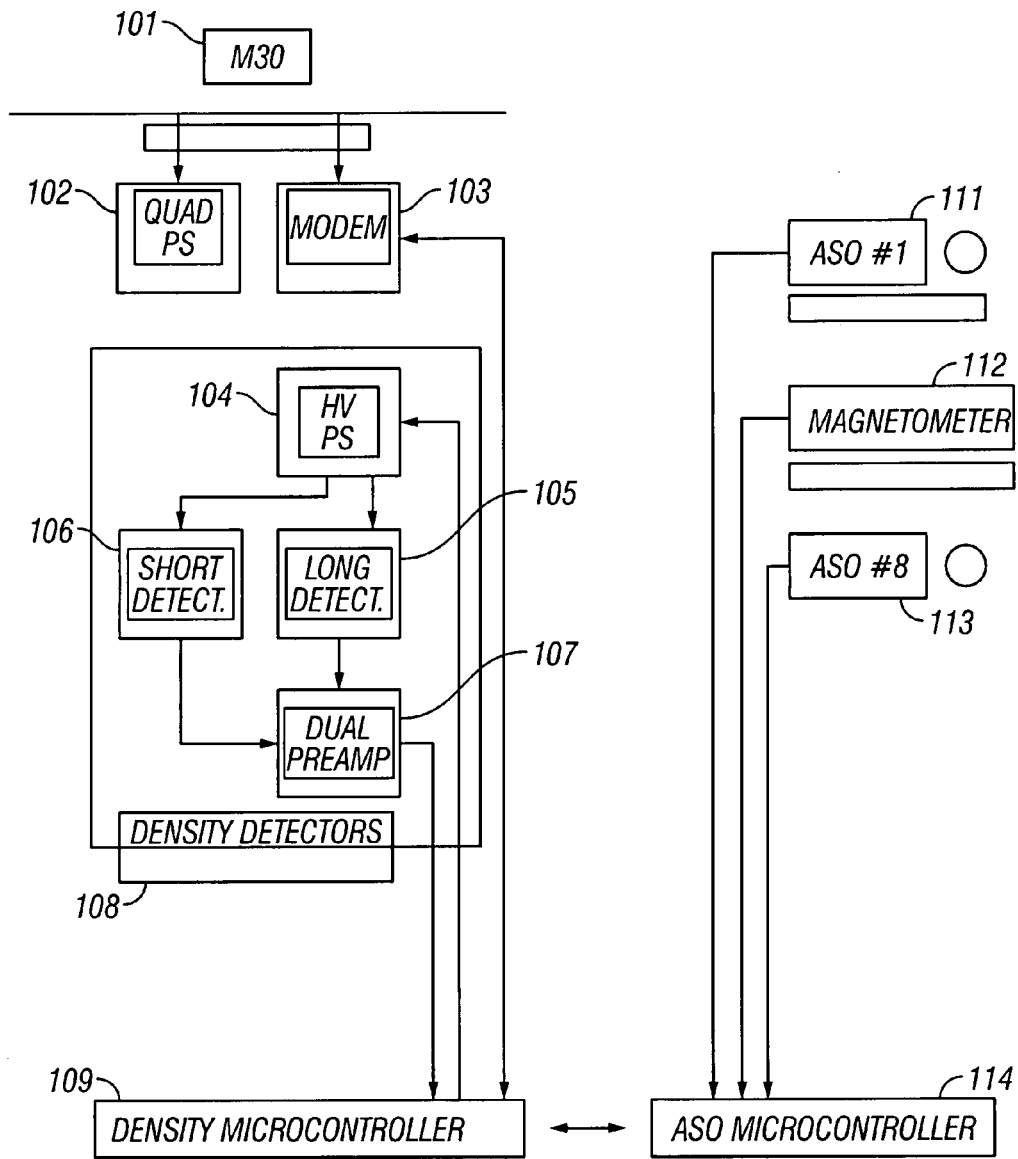
FIG. 2a shows a block diagram of an apparatus for making nuclear measurements as a function of azimuth.

Turning now to FIG. 2a, a block diagram of equipment used for determination of density by azimuthal sectors is shown. The microprocessor used for controlling density measurements is denoted by 109 while the microprocessor used for azimuth and stand off measurements is indicated by 114. The density measuring device 108 includes a source of nuclear radiation, two detectors denoted by 105 and 106, and the detectors power supply 104. The detectors 105 and 106 are called the LS and SS detectors (for long spaced and short spaced). A preamplifier for the output of the LS and SS detectors is denoted by 107. Also shown is a common system bus 101, and a modem 103. It should be noted that additional detectors could also be used. Operation of the density measuring device is known in the art and is not discussed further. For the purposes of the present invention, counts made by the LS and SS detectors are accumulated by azimuthal sectors while the MWD tool is rotating.

Figure 2B:
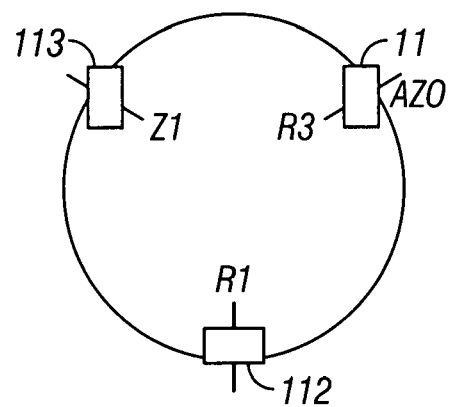
FIG. 2b shows a illustrating standoff and orientation sensors in a cross sectional view.

The standoff/azimuth determination assembly includes two stand off sensors 111 and 113 and a magnetometer 112. The spatial configuration of the standoff sensors and magnetometers is shown in FIG. 2b.

Figure 3:
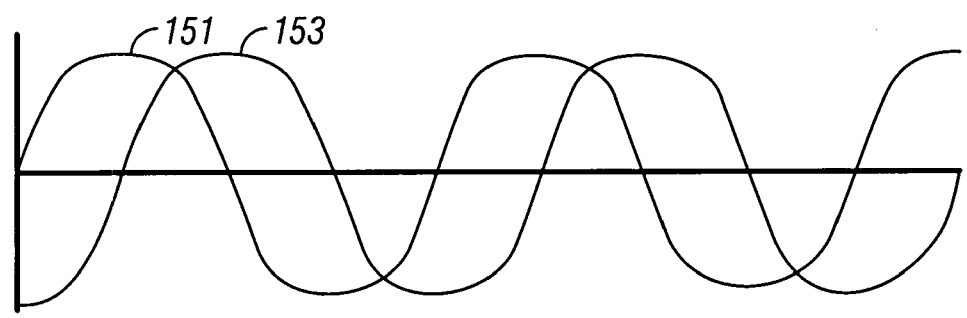
FIG. 3 shows measurements that would be made by two orthogonal magnetometers as a function of tool rotation in a vertical borehole.

FIG. 3 shows idealized magnetometer measurements that would be made by two magnetometers (referred to as x- and y-) magnetometers. These may be referred to as the $B_x$ and $B_y$ measurements. In a vertical borehole, the two magnetometer output should be a sinusoid. The magnetometers make measurements of a magnetic toolface angle that is responsive to the component of the earth's magnetic field along the sensitive axis of the magnetometer. In a deviated borehole, using known relations, the magnetic toolface angle can be converted to a high side toolface angle indicative of rotation of the tool about a longitudinal axis.

Figure 4:
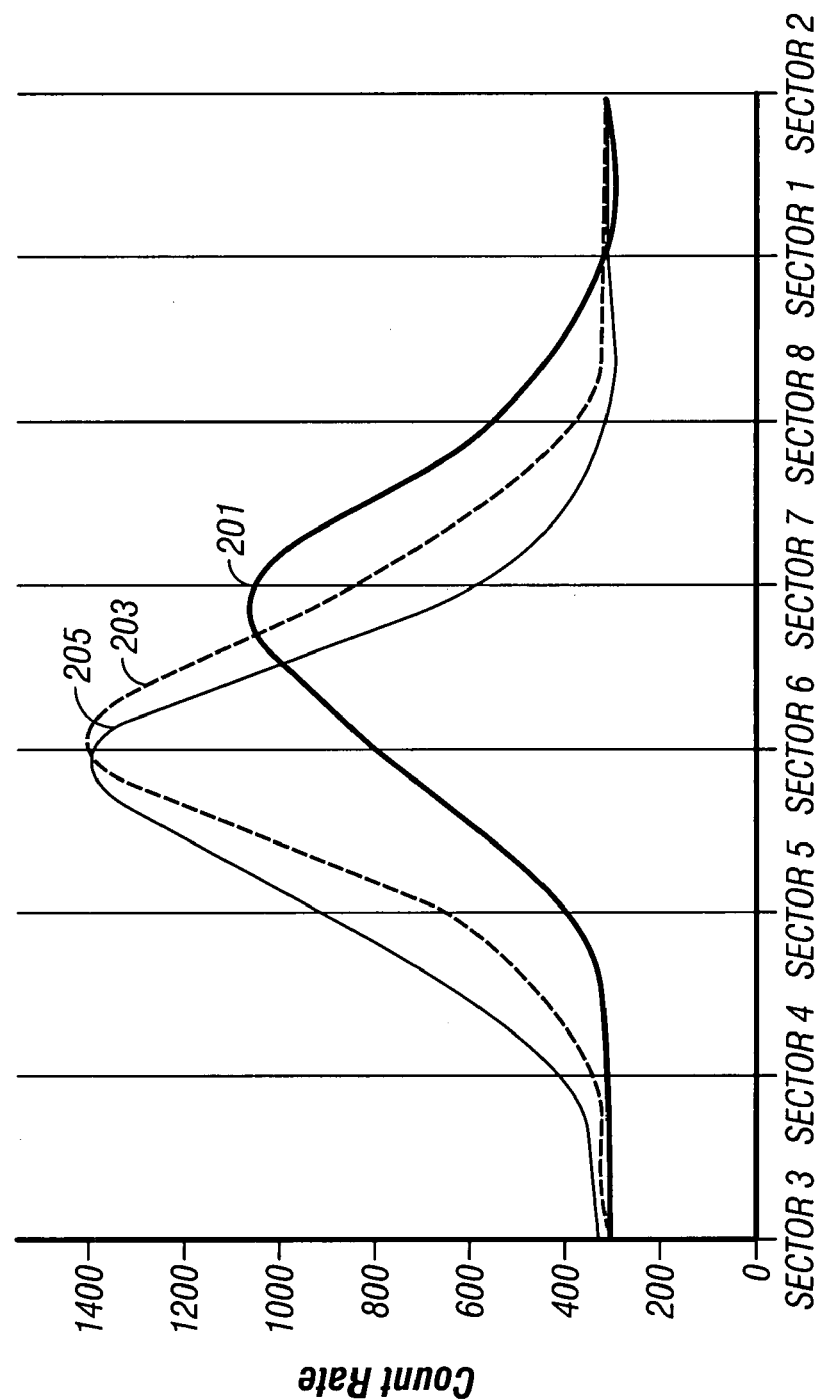
FIG. 4 shows the effect of rotation speed on nuclear measurements made with an exemplary sensor assembly.

Turning now to FIG. 4, an example of data recorded using density sensors on a rotating drillstring are shown. Processed data from eight azimuthal sectors, each 45° in size, are shown. Measurements made by nuclear sensors are statistical in the sense that they are dependent upon nuclear interactions such as scattering that can be described only in a statistical sense. For the data in FIG. 4, the source was in sector 7. The curve 201 gives the measured counts averaged over a number of rotations of the drillstring when the drillstring was rotating at 20 rpm. As can be seen, the measured count peaks at sector 7 (as it should) and the spread in the count is a measure of the resolution of the tool. When the rotation speed is increased to 125 rpm, the results are denoted by 203 and show that the peak count is not in sector 7 (as it should be) but occurs in sector 6. When the rotation speed is increased to 200 rpm, the peak count for the curve 205 is displaced closer towards sector 5. One cause of these erroneous measurements is a time delay in the electronics. In addition to the shift in the sector, it can be seen that the absolute counts are also quite different with the higher rotational speeds. This can give an erroneous interpretation of the magnitude of possible azimuthal variations of formation property.

Figure 5:
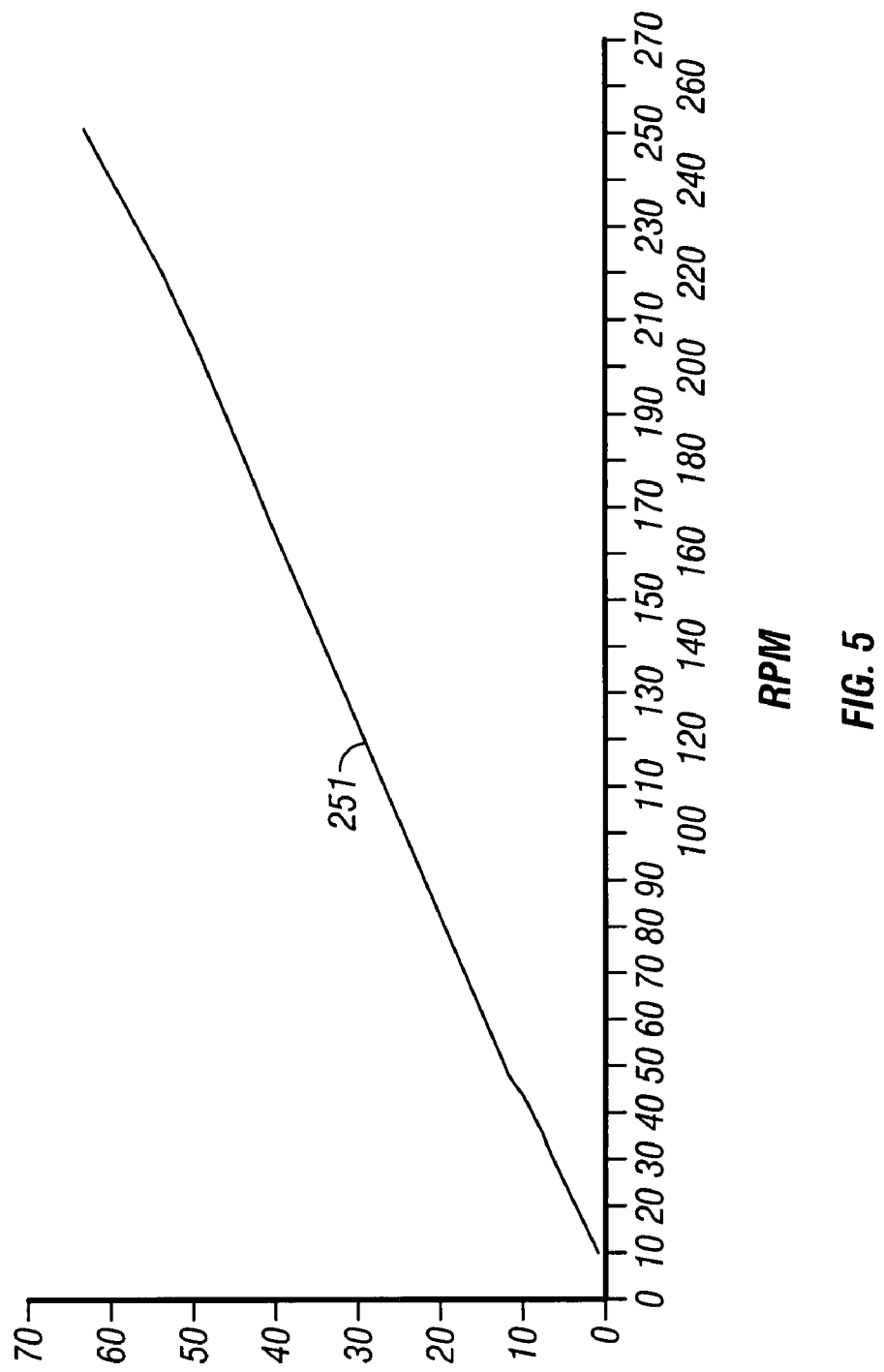
FIG. 5 shows simulated results of error in azimuth determination as a function of rotation speed.

Turning now to FIG. 5, shown is a simulated error 251 as a function of rotational speed of a uniformly rotating tool for a fixed time delay between the time azimuth measurements are made and the time at which they are matched up with a processor that processes the output of the nuclear sensors. This explains to a large part the shift in the peak values shown in FIG. 4. The spread in the measurements is, on the other hand, due to the statistical nature of the nuclear measurements. The abscissa is the rotation speed in rpm while the ordinate is the error in degrees. At 200 rpm, the error can be over 45° (or one sector). It should be noted that similar shifts would be observed with any kind of downhole azimuthal sensor measurements, such as resistivity measurements, nuclear magnetic resonance measurements, natural gamma measurements, etc. However, the other measurements would not show the statistically caused spread in the measurements observed with nuclear measurements.

Figure 6A:
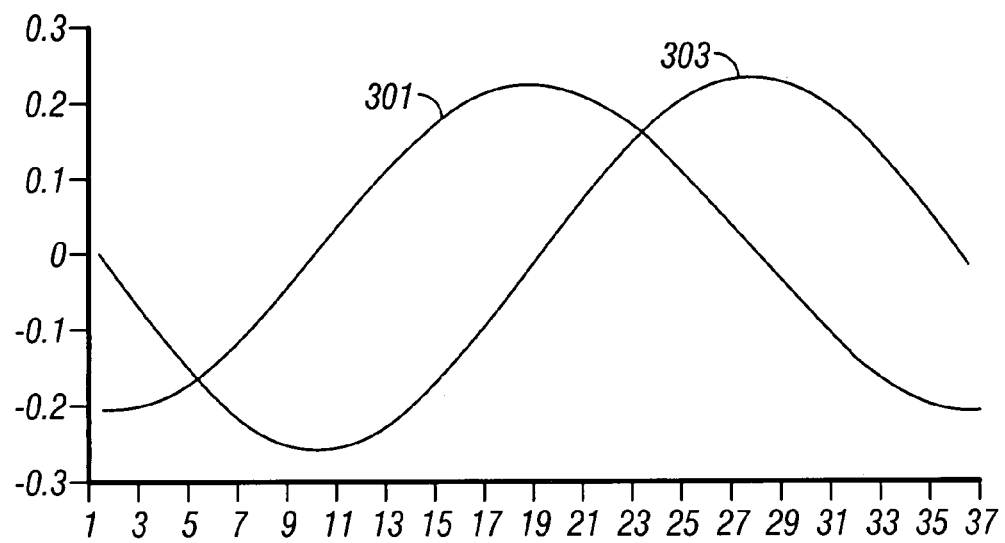
FIGS. 6a and 6b show the outputs of two orthogonal magnetometers on a rotating bottom hole assembly, and an error in the magnetometer measurements.
Figure 6B:
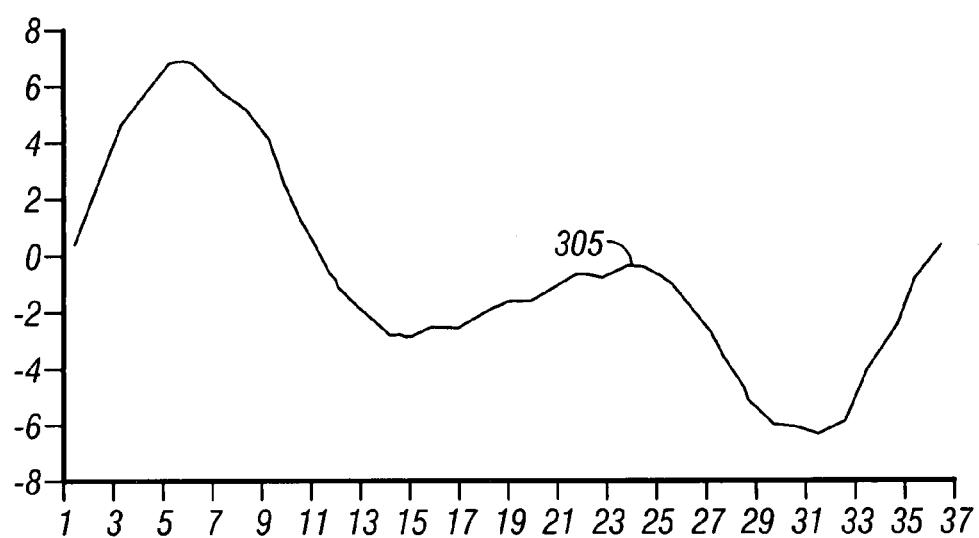

In reality, the rotational speed may not be uniform. The cause for non-uniform rotational speed are numerous, and includes the phenomenon known as stick-slip, wherein the drillbit sticks, and then resumes rotation intermittently. An example of what could be observed is shown in FIGS. 6a and 6b. Shown in FIG. 6a are simulated outputs from x- and y- magnetometers. The abscissa is the rotational angle in tens of degrees and the ordinate is a magnetometer output. FIG. 6b shows error 305 in degrees for one of the sensors. There are numerous sources of error that are included.

Figure 7:
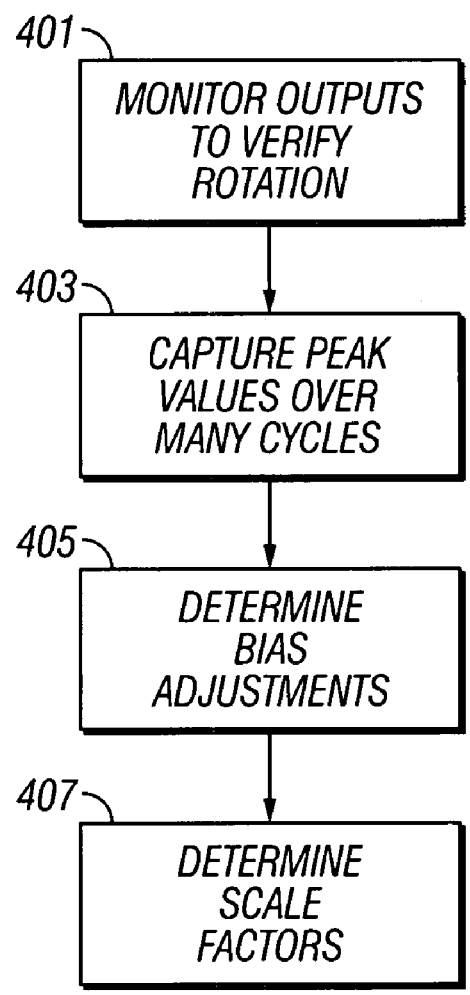
FIG. 7 shows a flow chart of an embodiment of the invention for correcting for errors resulting from use of the magnetometer measurements.

One source of error is the non-uniform rotation of the sensor assembly. Another source of error is a bias in the magnetometer readings. In the present invention, the errors are removed by using a methodology outlined in FIG. 7. A check is made of the magnetometer outputs to verify that rotation is occurring 401. Rotation can be confirmed by several techniques previously known in the art, including counting zero-crossings, counting peaks, computing an FFT and determining a fundamental frequency of a minimum amplitude in an expected range, or fitting a sinusoid to the sampled data within certain bounds. The outputs are accumulated over an appropriate period of time (or number of cycles or rotation and the average value is determined 403. This is done separately for the $B_x$ and $B_y$ measurements and gives a bias value that is stored in memory and is then subtracted from subsequent magnetometer measurements 405. A scale factor is then determined relating the magnitudes of the sinusoids for the $B_x$ and $B_y$ components 407. This is based on the assumption that the $B_x$ and $B_y$ measurements are exposed to the same external field and that they are primarily seeing the component of the earth's magnetic field in the radial direction (perpendicular to the tool axis). A check is made to make sure that the adjustments are within acceptable tolerances for changes and the rate of change. In open hole (with no local magnetic gradient), the compensated magnetometer should produce sinusoidal outputs while rotating at constant speed. A check of this condition can include fitting a sinusoid to the X and Y readings, respectively, and verifying sufficiently adequacy of the fit. If the presence of a significant gradient is indicated, the bias compensation routine can be delayed until drilling advances the sensor to a "clean" section of the wellbore.

A shift in the determined angle based on a nominal rotational speed (see FIG. 5) is then applied to the bias-corrected, scaled $B_x$ and $B_y$ measurements. Correcting both the bias and scale factor is required to avoid distortion of the derived toolface angle. The magnetic toolface angle is determined by $\tan^{-1}(B_y/B_x)$. Another source of error for which correction is applied is due to the effects of induced eddy currents in a rotating metallic drillstring. As discussed in U.S. Pat. No. 5,012,412, to Helm, the main effect of eddu currents is to produce a shift in the magnetic toolface angle that, like the errors due to time delays, is also a linear function of frequency.

It is common practice to use the high side (HS) toolface angle in many applications. In order to determine an offset between the HS toolface angle and the magnetic toolface angle measured by a rotating magnetometer, measurements may be made by an accelerometer when the BHA is not rotating.

Figure 8:
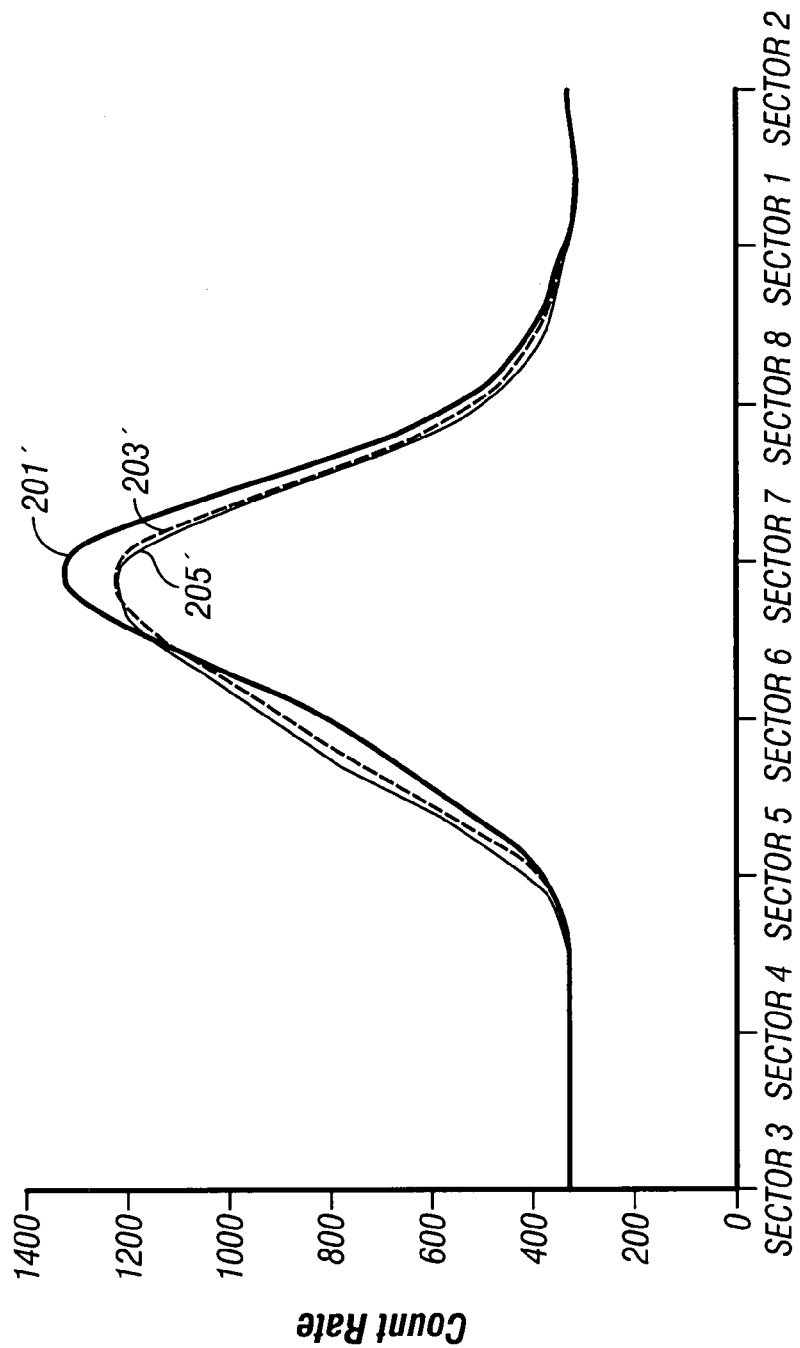
FIG. 8 shows corrected measurements corresponding to FIG. 4 using the method of the present invention.

Turning now to FIG. 8, a plot is shown of counts by sector after applying the corrections. Comparing with FIG. 4, it can be seen that the curves 203' and 205' do not show an azimuthal shift relative to the curve 201' (the lowest rotational speed). It is also seen that the magnitudes of the curves at higher speed are not much different from the magnitude at lower speed. This will give a better azimuthal image than would be obtained by data corresponding to FIG. 4.

The improvement in imaging capabilities also applies to other formation evaluation sensors. For example, prior art methods use resistivity sensors for obtaining a resistivity image of the borehole wall. Bedding of the earth formation is commonly indicated by resistivity contrasts, so that by fitting sinusoids to the resistivity image, a dip (and strike direction) of the bedding to the borehole axis can be obtained. Absolute dip and strike can then be inferred from survey information. In the presence of non-uniform rotation, the sinusoidal curve fitting can be a problem. With the method of the present invention, compensation is made for errors in the toolface angle, resulting in improved determination of bedding.

Figure 9:
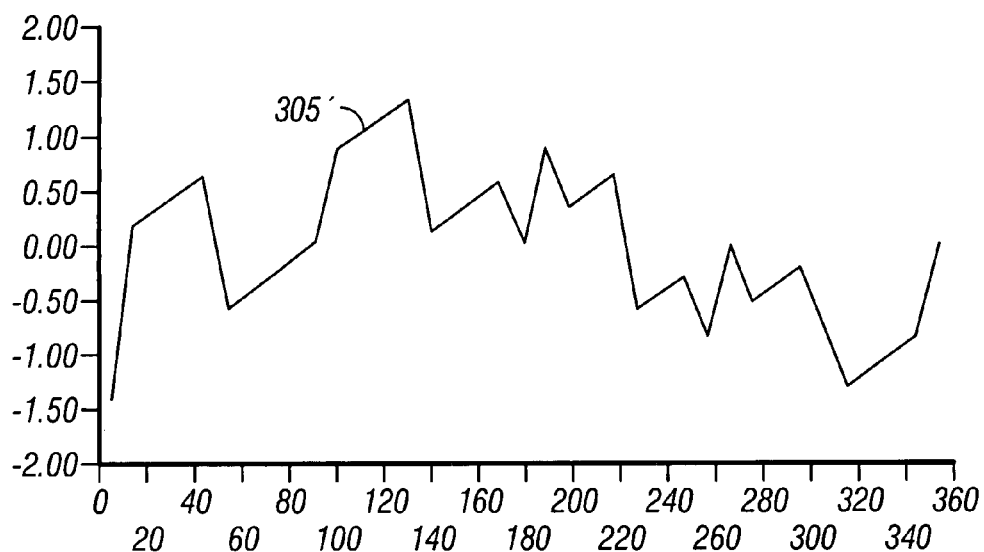
FIG. 9 shows an example of residual errors in use of the magnetometer outputs using the method of the present invention.

Another feature of the present invention is the selection of the low-pass filter used for the A/D converter for the magnetometer data. The angular error curve shown in FIG. 6b had a 50 Hz low pass filter applied to the magnetometer data. This is believed to be too restrictive. Shown in FIG. 9 is the angular error curve of the magnetometer data after applying the process discussed with respect to FIG. 7 and with a 250 Hz low pass filter for the A/D converter. The magnitude of the error is typically less than 1° compared to values as large as 6° in FIG. 7.

Figure 10A:
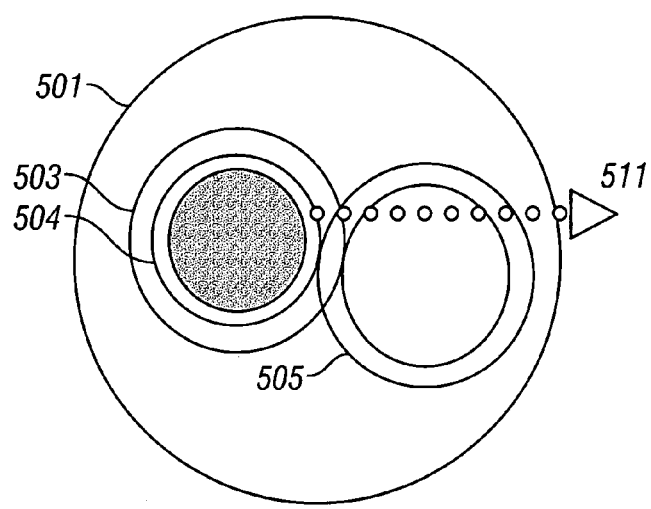
FIGS. 10a and 10b show potential problems associated with drilling of directional wells having a common conductor.
Figure 10B:
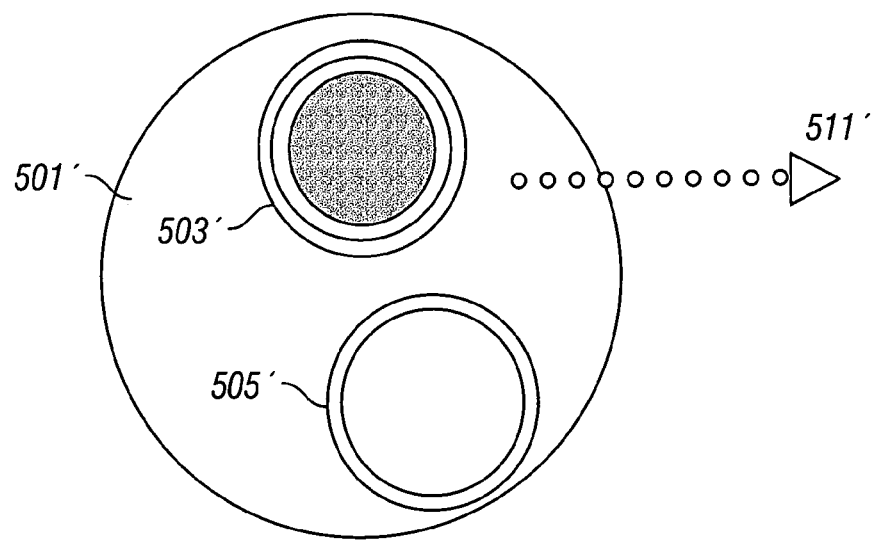

Another embodiment of the present invention uses two magnetometers as a gradiometer. Such an arrangement may be used in drilling of directional wells using a shared conductor. A cross sectional view of the arrangement is shown in FIG. 10a where a large borehole 501 has been drilled into the earth formation below the shared conductor. Also shown are two casing lines 503, 505 that are in intimate electrical and magnetic contact with each other over several hundreds or thousands of meters. The two casings may be twisted to an unknown extent over the depth range. One of the casings, say 505 extends deeper than casing 503. The objective is to drill the well with casing 503 using drillstring 504 in a desired direction such as that denoted by 511. It can be seen that with the arrangement shown in FIG. 10a, the well would be drilled through the casing 505, something that is clearly undesirable. On the other hand, if the two casings are in the relative positions shown as 503' and 505' seen in FIG. 10b, the deviated well 511' may be drilled without the problem depicted in FIG. 10a. The present invention makes it possible to determine the relative positions of the two casings in the presence of an unknown amount of twisting.

Figure 11:
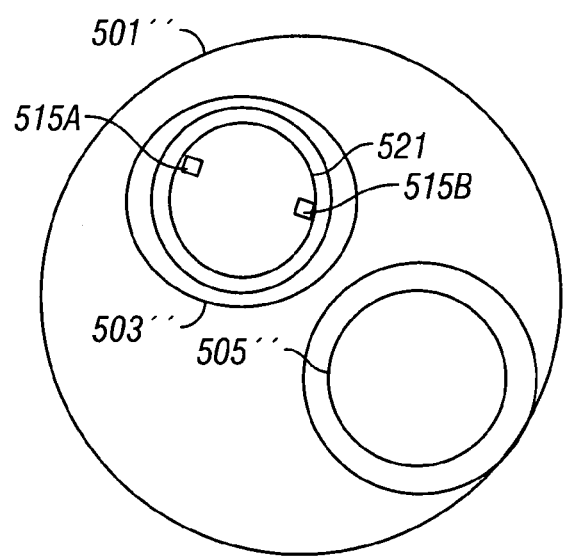
FIG. 11 shows a schematic diagram of a configuration of magnetometers suitable for use as a gradiometer for directional drilling.

In the present invention, the determination of the relative orientation of two casings is determined by using the configuration shown in FIG. 11. Two magnetometers labeled 515a and 515b are placed on opposite sides of an MWD collar 521. The pair of magnetometers is then used as a gradiometer that provides an indication of the orientation of the casing 505" relative to the collar 521. In order to get an accurate measurement of the orientation, it is necessary that the calibration of the two magnetometers be properly determined.

Figure 12:
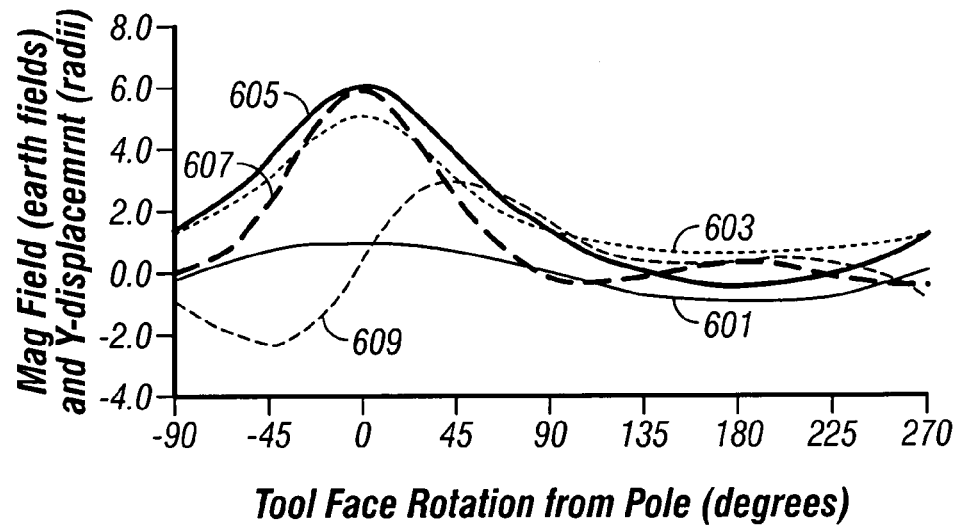
FIG. 12 shows exemplary outputs for the magnetometers of FIG. 11 making possible the drilling of directional wells.

FIG. 12 shows several curves of measurements made by magnetometers on a rotating drillstring in the presence of a field gradient due to a magnetic pole on an adjacent casing. The abscissa is the tool face rotation angle and the ordinate is the field measurement. The units for the ordinate are relative to the earth's magnetic field. The Toolface angle of 90° corresponds to magnetic north for the illustration. The curve 601 shows the sinusoidal variation of the earth's magnetic field. The curve 603 shows the effect of a magnetic pole on a second casing on the magnetic field. The asymmetry of the curve 603 is an indication of the field gradient and results from the fact that one side of a rotating drill collar is closer to the magnetic pole than the other side. For the illustrative example, only the distance from the magnetic pole has been considered and angular effects have been ignored. In a more accurate calculation, the angular effect can be taken into account. For the example shown, the magnetic pole is oriented in the same direction as the earth's magnetic field. A more accurate calculation could account for the difference between magnetic north and the orientation of the magnetic pole. For the example shown, as is typically the case, the effect of the magnetic pole on an adjacent casing is much greater than the earth's magnetic field. The curve 605 shows the sum of curves 601 and 603, while the curve 607 shows a field measured by a biased $B_x$ magnetometer at 515b, i.e., with its sensitive axis radially inwards on the rotating drill collar. The curve 609 shows measurements that would be made by a biased $B_y$ magnetometer at 515b, i.e., one with a sensitive axis tangential to the rotating drill collar.

Figure 13:
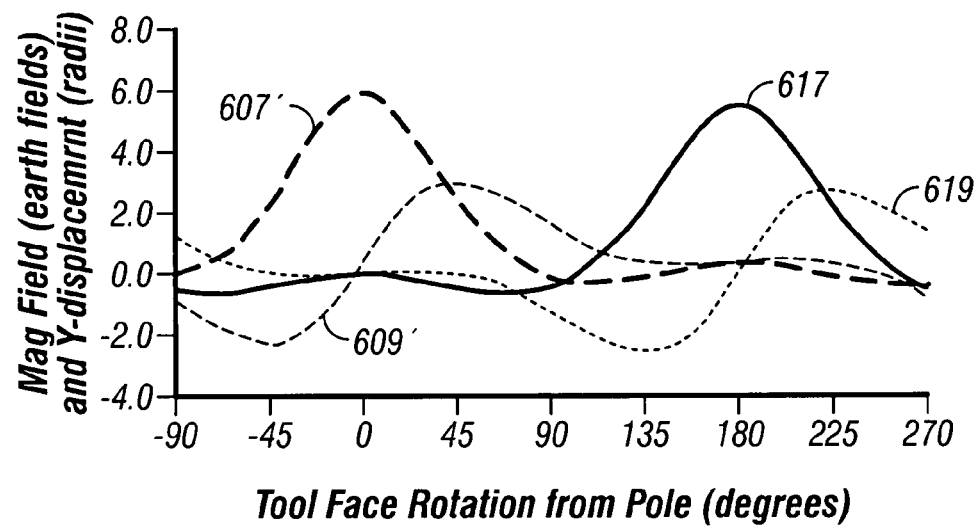
FIG. 13 shows measurements by additional magnetometers on opposite sides of the drill collar.

Turning now to FIG. 13, curves 607' and 609' are the same as curves 607 and 609. Curves 617 and 619 show what would be measured by second $B_x$ and $B_y$ magnetometers on the opposite side of the drill collars, i.e., at 515a. Next, FIG. 14 shows the first $B_x$ and $B_y$ responses 607" and 609", the second $B_x$ response 617", and the difference between the first and second $B_x$ response 621, i.e., the output of a gradiometer.

Figure 14:
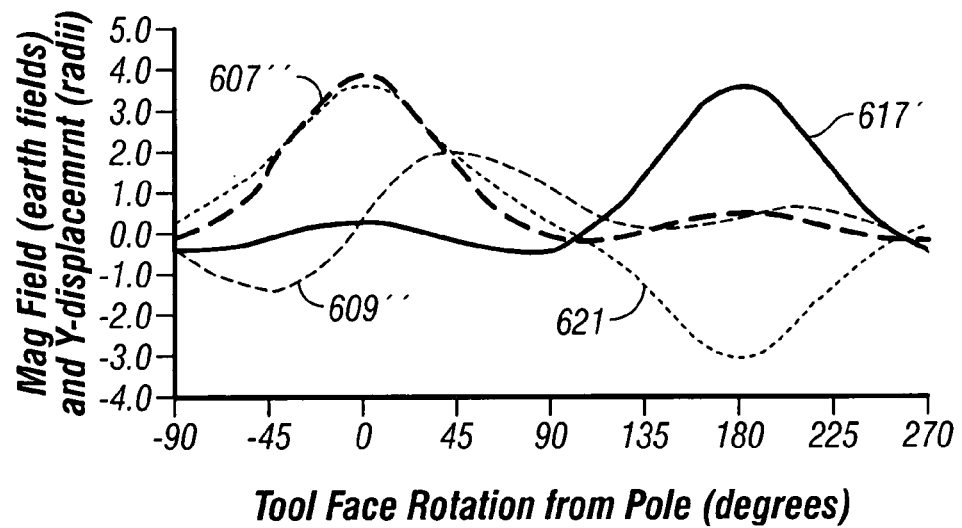
FIG. 14 shows the output of magnetometers used as a gradiometer.

It is clear from FIGS. 12-14 that the relative orientation of the magnetic pole relative to the drill collar 521 can be determined from either single magnetometer measurements, or from dual magnetometer (gradiometer) measurements. In the case where rotation is limited, the dual magnetometer method has clear advantages. When free rotation is allowed, the advantage of using a single eccentric magnetometer is that it has the same bias and scale factor errors independent of its position.

Figure 15:
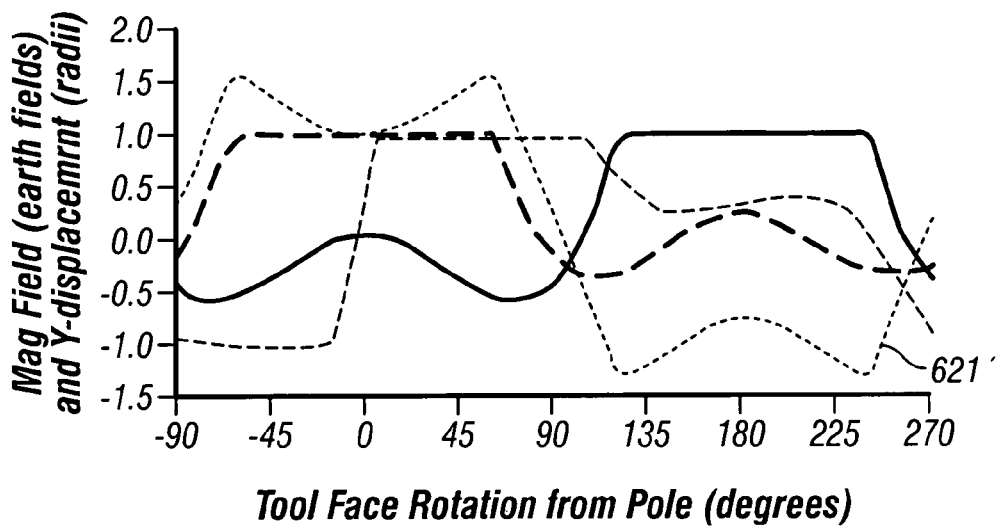
FIG. 15 illustrates the effect of clipping of the magnetometer signals.

As a practical matter, the A/D converter for the magnetometer measurements is commonly configured so as to clip values above a certain level. The effect of this clipping in an extreme case is illustrated in FIG. 15 where the clipping value is set equal to the earth's magnetic field. The curve 621' in FIG. 15 corresponds to the gradiometer measurement 621 in FIG. 14 and shows that even with severe clipping, the relative orientation of a magnetic pole on a casing proximate to a drill collar can be determined. The shape and character of the waveform resulting from sampling during rotation, in addition to the peak values acquired, can be analyzed to deduce the orientation of the adjacent magnetic pole.

In order to drill the offset well in a desired direction, an independent survey would need to be carried out using at gyroscopes or accelerometers. A suitable gyroscopic arrangement for such a survey is disclosed in U.S. Pat. No. 6,347,282 to Estes et al., having the same assignee as the present application and the contents of which are fully incorporated herein by reference.

With very well-calibrated and accurate magnetometers, the rotation at an eccentric mounting point provides the ability to obtain 3 radial measurement points. Taking $B_x$ readings at 0° and 180° and $B_y$ readings at 270° and/or 90°, it is possible to determine the distance to the pole, the distance to undisturbed earth field, and the pole strength. In addition, pole biases at each magnetometer and direction to the interference pole can be calculated with additional rotations, vertical displacements, and computations.

To enhance the magnetic signals, a strategically placed permanent magnet can serve as a "hot spot" in the adjacent casing. In an alternate embodiment of the invention, acoustic sensing devices could be used for determination of relative orientation of the two casings. In yet another embodiment of the invention, the casing 505" may be provided with a radioactive "hot spot" that can be detected by a gamma ray sensor on the drill collar 521.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating an earth formation during drilling, the method comprising:
   (a) making first measurements with an orientation sensor indicative of a toolface angle of a bottomhole assembly (BHA) during rotation thereof;
   (b) making a plurality of second measurements with a directionally sensitive formation evaluation (FE) sensor during the rotation;
   (c) correcting the plurality of second measurements using a speed of rotation of the BHA determined at least in part from the first measurements.

2. The method of claim 1 further comprising selecting the orientation sensor from the group consisting of (i) a magnetometer, and, (ii) an accelerometer, and a gyroscope.

3. The method of claim 1 further comprising selecting the directionally sensitive FE sensor from the group consisting of (i) a nuclear sensor, (ii) a resistivity sensor, (iv) a nuclear magnetic resonance sensor, and, (iv) a natural gamma sensor.

4. The method of claim 1 wherein the correcting of the plurality of second measurements further comprises verifying the occurrence of rotation of the BHA by analysis of the plurality of first measurements.

5. The method of claim 4 wherein the correcting the plurality of second measurements further comprises accumulating the plurality of first measurements over at least one of (i) a time interval, and, (ii) a selected number of rotations of the BHA.

6. The method of claim 5 wherein the correcting the plurality of second measurements further comprises determining a bias value in said first measurements.

7. The method of claim 1 wherein the correcting of the plurality of second measurements further comprises applying a low pass filter to the first plurality of measurements.

8. The method of claim 1 further comprising:
   (i) making a measurement of high side (HS) toolface angle with an accelerometer at a time when the BHA is not rotating,
   (ii) using a relationship between the first measurements and the HS toolface angle measurement to apply an offset correction to subsequent measurements made by the orientation sensor and the directionally sensitive FE sensor.

9. The method of claim 1 further comprising correcting for toolface shifts caused by eddy currents in the conductive BHA proportional.

10. An apparatus for evaluating an earth formation during drilling, the apparatus comprising:
   (a) an orientation sensor on a bottomhole assembly (BHA) which makes measurements indicative of a toolface angle of the BHA during rotation thereof;
   (b) a directionally sensitive formation evaluation (FE) sensor on the BHA which makes measurements of a property of the earth formation during the rotation; and
   (c) a processor which corrects the plurality of second measurements using a speed of rotation of the BHA.

11. The apparatus of claim 10 wherein the orientation sensor is selected from the group consisting of (i) a magnetometer, and, (ii) an accelerometer.

12. The apparatus of claim 10 wherein the directionally sensitive FE sensor is selected from the group consisting of (i) a nuclear sensor, (ii) a resistivity sensor, (iv) a nuclear magnetic resonance sensor, and, (iv) a natural gamma sensor.

13. The apparatus of claim 10 wherein the processor further corrects the plurality of second measurements based at least in part on verification of occurrence of rotation of the BHA.

14. The apparatus of claim 13 wherein the processor corrects the plurality of second measurements based at least in part on accumulating the plurality of first measurements over at least one of (i) a time interval, and, (ii) a selected number of rotations of the BHA.

15. The apparatus of claim 13 wherein the processor further corrects the plurality of second measurements by determining a bias value in the plurality of first measurements.

16. The apparatus of claim 10 wherein the processor corrects the plurality of second measurements using a low pass filter.

17. The apparatus of claim 10 wherein the BHA is conveyed into the borehole on one of (i) a drillstring, and, (ii) coiled tubing.

18. A machine readable medium having instructions for evaluating an earth formation, the medium comprising instructions for:
   using a first plurality of measurements made by an orientation sensor on a rotating bottom hole assembly (BHA) for correcting a second plurality of measurements made by a directionally sensitive formation evaluation (FE) sensor on the BHA using a speed of rotation of the BHA.

19. The machine readable medium of claim 18 wherein the orientation sensor is selected from the group consisting of (i) a magnetometer, and, (ii) an accelerometer.

20. The machine readable of claim 18 wherein the directionally sensitive FE sensor is selected from the group consisting of (i) a nuclear sensor, (ii) a resistivity sensor, (iv) a nuclear magnetic resonance sensor, and, (iv) a natural gamma sensor.

21. The machine readable medium of claim 18 further comprising instructions for verifying the occurrence of rotation of the BHA by analysis of the plurality of first measurements.

22. The machine readable medium of claim 18 further comprising instructions for determining a bias value in the plurality of first measurements.

23. The machine readable medium of claim 18 wherein the medium is selected from:
   (i) ROMs, (ii) EPROMs, (iii) EAROMs, (iv) Flash Memories, and, (v) Optical disks.

24. A method of drilling a borehole in an earth formation, the method comprising:
   (a) conveying a plurality of magnetometers into the borehole on a bottomhole assembly (BHA);
   (b) determining from outputs of the plurality of magnetometers an indication of a source of magnetic disturbance in proximity to the borehole; and
   (c) controlling a direction of the drilling based on said indication.

25. The method of claim 24 wherein each of the plurality of magnetometers comprises a two-component magnetometer.

26. The method of claim 24 wherein said indication comprises a gradient of a magnetic field.

27. The method of claim 24 wherein the source of magnetic disturbance comprises a casing.

28. The method of claim 24 wherein outputs of the plurality of magnetometers are clipped.

29. The method of claim 24 wherein controlling of the drilling direction is based at least in part on an asymmetry of measurements made by at least one of the plurality of magnetometers during continued rotation of the BHA.

30. The method of claim 26 wherein each of the plurality of two component magnetometers has a bias, the method further comprising determining the bias for each of the two component magnetometers.

31. The method of claim 27 wherein the casing includes at least one of (i) a permanent magnet, and, (ii) a radioactive source.

32. The method of claim 27 wherein the outputs of the magnetometers are based on $B_x$ measurements at orientations of the BHA substantially 180° apart and $B_y$ measurements at orientations of the BHA substantially orthogonal to the orientations at which the $B_x$ measurements are made.

33. An apparatus for drilling a borehole in an earth formation, the apparatus comprising:
   (a) a bottomhole assembly (BHA) including a drill bit;
   (b) at least two magnetometers positioned at substantially opposite sides of the BHA;
   (c) a processor on the BHA which:
      (A) determines from outputs of the at least two magnetometers a magnetic field gradient, and (B) controlling a drilling direction of the BHA based on the determined magnetic field gradient.

34. The apparatus of claim 33 wherein each of the at least two magnetometers comprises a two-component magnetometer.

35. The apparatus of claim 33 wherein the determined field gradient is indicative of a direction of a casing external to the borehole.

36. The apparatus of claim 33 wherein outputs of the at least two magnetometers are clipped.

37. The apparatus of claim 33 wherein the processor controls the drilling direction based at least in part on an asymmetry of measurements made by at least one of the at least two magnetometers during continued rotation of the BHA.

38. The apparatus of claim 34 wherein each of the plurality of two component magnetometers has a bias, and wherein the processor further determines the bias for each of the two component magnetometers.

39. The apparatus of claim 34 wherein the processor further determines a scale factor relating the two components of at least one of the plurality of two component magnetometers.

* * * * *

UNITED STATES PATENT AND TRADEMARK OFFICE
CERTIFICATE OF CORRECTION

| | | |
|---|---|---|
| PATENT NO. | : 7,252,144 B2 | Page 1 of 1 |
| APPLICATION NO. | : 10/998494 | |
| DATED | : August 7, 2007 | |
| INVENTOR(S) | : Robert A. Estes et al. | |

It is certified that error appears in the above-identified patent and that said Letters Patent is hereby corrected as shown below:

Title Page, Item (60), please delete "60/526,446" and insert therefor -- 60/526,448 --

Signed and Sealed this
Twenty-fourth Day of July, 2012

David J. Kappos
*Director of the United States Patent and Trademark Office*